United States Patent
Delia et al.

(10) Patent No.: US 10,977,871 B2
(45) Date of Patent: Apr. 13, 2021

(54) DELIVERY OF A TIME-DEPENDENT VIRTUAL REALITY ENVIRONMENT IN A COMPUTING SYSTEM

(71) Applicant: INTERNATIONAL BUSINESS MACHINES CORPORATION, Armonk, NY (US)

(72) Inventors: David Delia, Lagrangeville, NY (US); Wayne M. Delia, Poughkeepsie, NY (US); Derek Difazio, Port Chester, NY (US); Eric Lei, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 15/962,090

(22) Filed: Apr. 25, 2018

(65) Prior Publication Data
US 2019/0333285 A1    Oct. 31, 2019

(51) Int. Cl.
G06T 19/20 (2011.01)
A63F 13/63 (2014.01)
G06T 15/20 (2011.01)

(52) U.S. Cl.
CPC .............. *G06T 19/20* (2013.01); *A63F 13/63* (2014.09); *G06T 15/205* (2013.01); *A63F 2300/6018* (2013.01)

(58) Field of Classification Search
CPC ....... G06T 19/20; G06T 15/205; G06T 17/00; G06T 19/006; A63F 2300/6018; G06F 3/011; G06F 3/04815
See application file for complete search history.

(56) References Cited

U.S. PATENT DOCUMENTS

| | | | |
|---|---|---|---|
| 8,489,115 B2* | 7/2013 | Rodriguez | G01C 21/3629 455/456.1 |
| 8,930,844 B2 | 1/2015 | Carlin | |
| 9,286,711 B2* | 3/2016 | Geisner | G09G 5/00 |
| 9,690,370 B2 | 6/2017 | Levesque et al. | |
| 9,721,393 B1* | 8/2017 | Dunn | G06T 19/006 |
| 10,140,754 B1* | 11/2018 | Voris | G06T 19/20 |
| 2011/0093418 A1 | 4/2011 | Kwok | |
| 2016/0098936 A1 | 4/2016 | Solomon | |
| 2018/0117446 A1* | 5/2018 | Tran | A61B 5/0022 |

OTHER PUBLICATIONS

Donalek et al., "Immersive and Collaborative Data Visualization Using Virtual Reality Platforms," IEEE International Conference on Big Data, 2014 (6 pages).
Olshannikova et al., "Visualizing Big Data with augmented and virtual reality: challenges and research agenda," Journal of Big Data, 2015 (27 pages).
Moran et al., "Improving Big Data Visual Analytics with Interactive Virtual Reality," IEEE High Performance Extreme Computing Conference (HPEC), 2015 (6 pages).

* cited by examiner

*Primary Examiner* — Samantha (Yuehan) Wang
(74) *Attorney, Agent, or Firm* — Griffiths & Seaton PLLC

(57) ABSTRACT

Embodiments for delivery of a time-dependent virtual reality environment by a processor. A time-dependent three dimensional (3D) virtual environment, having one or more configurable boundary parameters, may be created according to user input, one or more cognitive computing systems, data resources, or a combination thereof.

17 Claims, 9 Drawing Sheets

DELIVERY OF A TIME-DEPENDENT VIRTUAL REALITY ENVIRONMENT IN A COMPUTING SYSTEM

BACKGROUND OF THE INVENTION

Field of the Invention

The present invention relates in general to computing systems, and more particularly, to various embodiments for delivery of a time-dependent virtual reality environment in a computing system using one or more computing processors.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems. For example, technological advances enable computer systems such as, for example, console gaming systems, to grow in popularity with a wide array of functions and features.

SUMMARY OF THE INVENTION

Various embodiments for delivery of a time-dependent virtual reality environment in a computing system by a processor are provided. In one embodiment, by way of example only, a method for delivery of a time-dependent virtual reality environment, again by a processor, is provided. A time-dependent three dimensional (3D) virtual environment, having one or more configurable boundary parameters, may be created according to user input, one or more cognitive computing systems, data resources, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
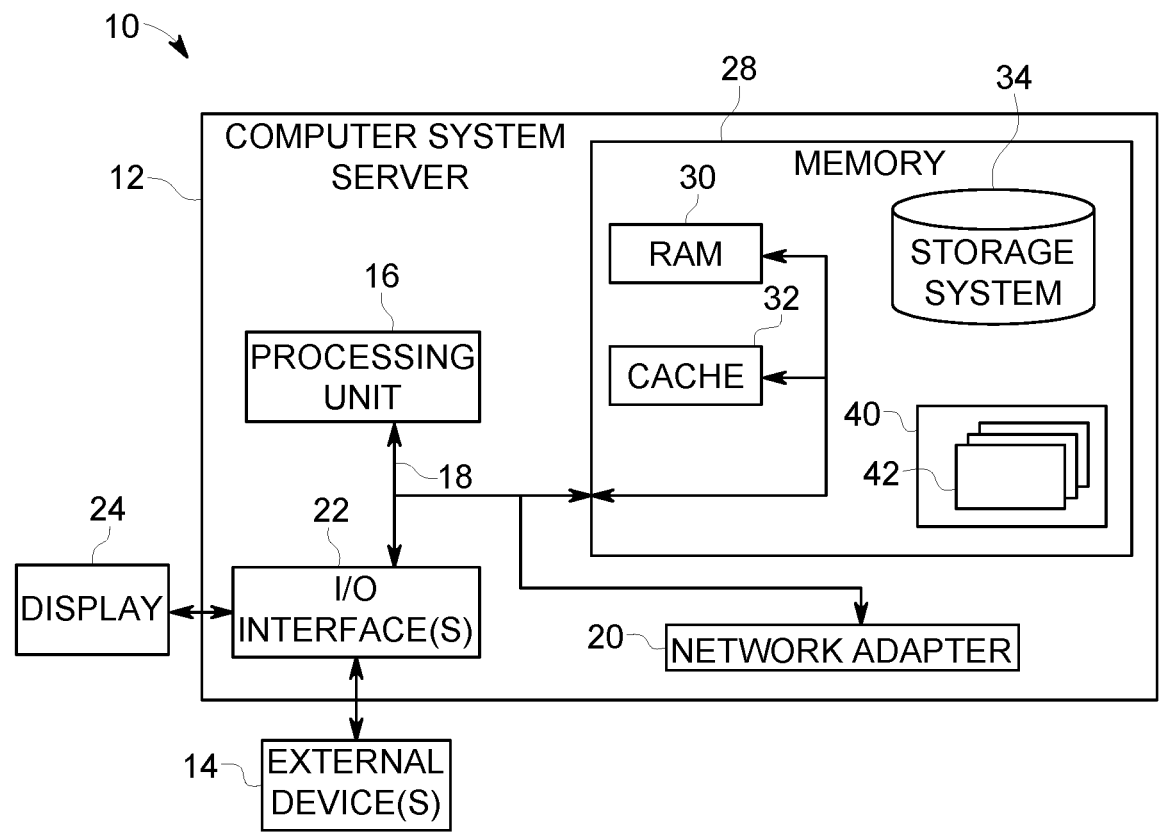
FIG. 1 is a block diagram depicting an exemplary cloud computing node according to an embodiment of the present invention.

Various embodiments relate to the field of cognitive systems with respect to Big Data application and virtual reality simulation. Big Data is a collection of tools, techniques, and operations used for data sets that becomes so voluminous and complex that traditional data processing applications are inadequate to store, query, analyze or process the data sets using current database management and data warehousing tools or traditional data processing applications. As computer and console gaming continue to grow in popularity and newer virtual reality technologies continue to gain traction, the virtual environments utilized by various games and computing systems are growing in significance. For example, the physical landscape of various games, mapping systems, and/or computing systems are vital to the impact of the functionality and features (e.g., for actual gameplay) similar to how the location of a film can add new dimensions to a motion picture.

Accordingly, a need exists to provide a solution that leverages unstructured data from available Big Data sources to enable time and/or era specific simulation for a three dimensional (3D) virtual environment. In one aspect, the present invention provides a cognitive system for the digital creation of 3D virtual environments that emulates specific past dates or time-periods for specific locations. One or more big data sources may be used for 3D virtual environments creation. Also, additional non-conventional data sources may also be used to enhance, refine, and/or alter a simulated environment and/or the time/era specific emulation. A user may provide user input to the user's customized 3D virtual environment (e.g., a 3D virtual gaming environment) by selecting both time-period details and location data.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
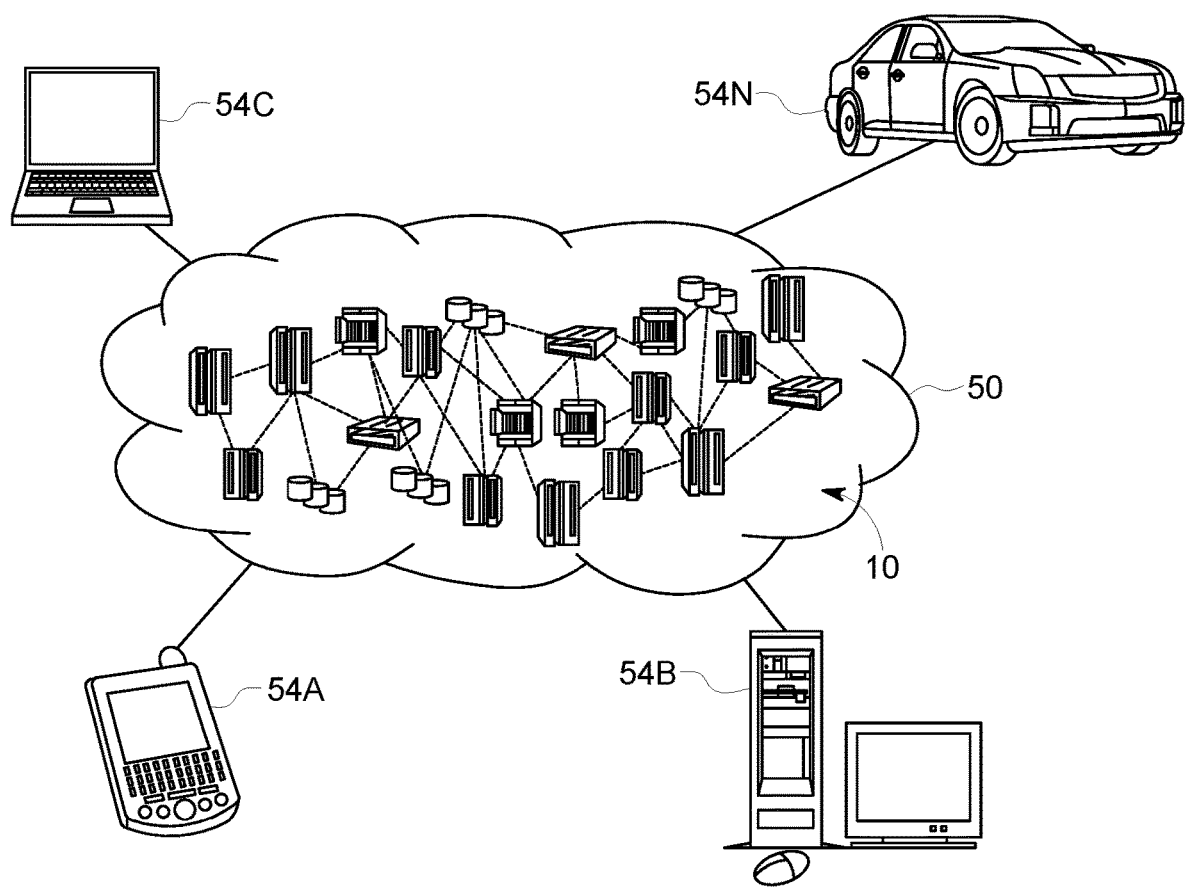
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or video gaming system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
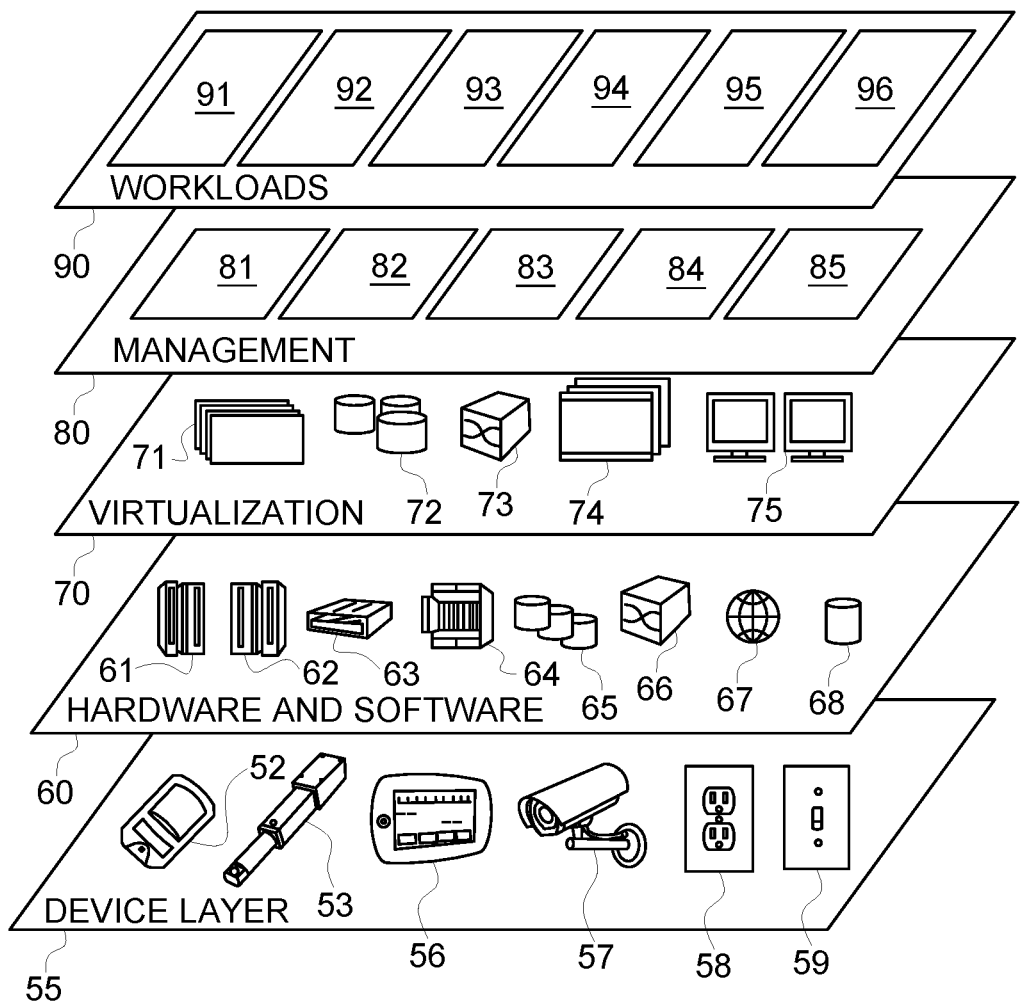
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various consistent data replication workloads and functions 96. In addition, data replication workloads and functions 96 may include such operations as data analytics, data analysis, and as will be further described, notification functionality. One of ordinary skill in the art will appreciate that the consistent data replication workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, a time-dependent three dimensional (3D) virtual environment, having one or more configurable boundary parameters, may be created according to user input, one or more cognitive computing systems, data resources, or a combination thereof.

Figure 4:
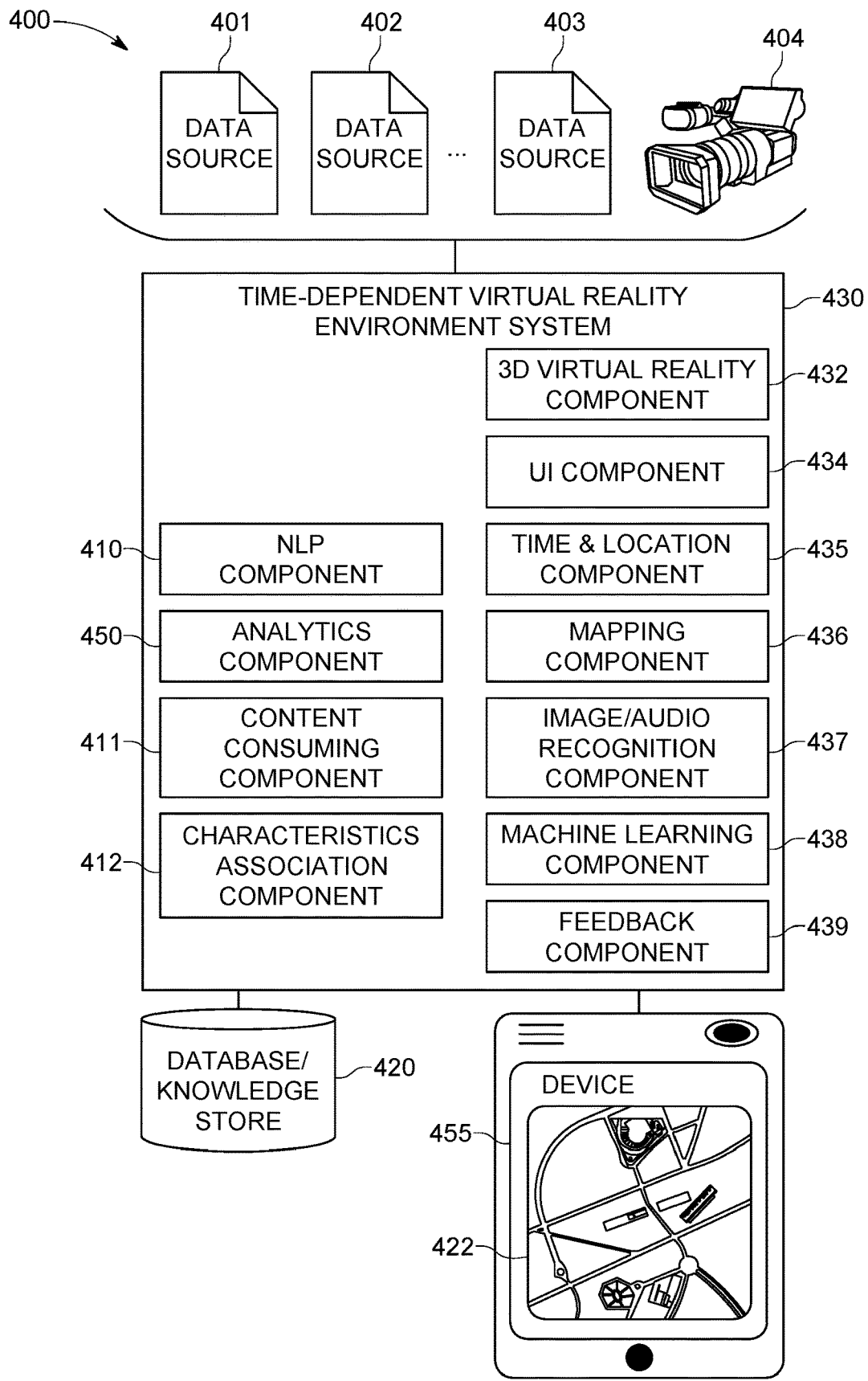
FIG. 4 is a diagram depicting various user hardware and computing components functioning in accordance with aspects of the present invention.

Turning now to FIG. 4, a block diagram of exemplary functionality 400 relating to extraction and summarization of decision discussions is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for extraction and summarization of decision methods and features in accordance with the present invention, such as those described in FIGS. 1-3. Many of the functional blocks 400 may execute as background processes on various components, either in distributed computing components, or on the user device, or elsewhere.

Multiple data sources 401-404 may be provided by one or more data resources (e.g., cloud computing services, Big Data resources such as, for example, a distributed file system i.e., a Hadoop file system ("HDFS")). The data sources 401-404 may be provided as a corpus or group of data sources defined and/or identified. The data sources 401-404 may include, but are not limited to, data sources relating to one or more documents, historical records, government records, newspaper articles and images, mapping and geographical records and data, structural data (e.g., buildings, landmark, etc.), musical archive data, books, scientific papers, online journals, journals, articles, drafts, materials related to emails, audio data, images or photographs, video data, and/or other various documents or data sources capable of being analyzed, published, displayed, interpreted, transcribed, or reduced to text data. The data sources 401-404 may be all of the same type, for example, pages or articles in a wiki or pages of a blog. Alternatively, the data sources 401-404 may be of different types, such as word documents, wikis, web pages, power points, printable document format, or any document capable of being analyzed by a natural language processing system.

In addition to text-based documents, other data sources such as audio, video or image sources may also be used wherein the audio, video or image sources may be pre-analyzed to extract or transcribe their content for natural language processing, such as converting from image to text, text to image, or visual recognition and analysis. For example, a photograph combined with a newspaper article and mapping data (e.g., global positioning satellite ("GPS") data) may be analyzed for creating a 3D virtual representation of a particular location at a selected time (e.g., creating a 3D virtual representation of a city park in 1930 based on the photographs, newspaper articles, and mapping data). As an additional example, a media capturing device 404 (e.g., a camera) may have captured a photograph of a selected time period such as, for example, an aerial image/photograph of a city landscape in 1945. The image data captured by the media capturing device 404 may be analyzed and used to recreate a 3D virtual representation of a particular location at a selected time as compared to the same, current city landscape. The group of data sources 401-404 are consumed for an extraction, analysis, and processing for creating the 3D virtual representation of a particular location at a selected time using natural language processing (NLP) and artificial intelligence (AI) to create the time-dependent virtual reality environment system 430.

The data sources 401-404 may be analyzed by an NLP component 410 (and a time and location component 435 if necessary) to data mine, analyze image data, transcribe relevant information from the content of the data sources 401-404 (e.g., documents, emails, reports, notes, records, maps, images, video recordings, live-streaming communications, etc.) in order to create the 3D virtual representation and/or provide the information in a more searchable and displayable manner. The NLP component 410 may be provided as a cloud service or as a local service.

The time-dependent virtual reality environment system 430 may include the NLP component 410, a content consuming component 411, a characteristics association component 412, and an analytics component 450. The NLP component 410 may be associated with the content consuming component 411. The content consuming component 411 may be used for inputting the data sources 401-404 and running NLP and AI tools against them, learning the content, such as by using the machine learning component 438. It should be noted that other components of FIG. 4 may also employ one or more NLP systems and the NLP component 410 and is merely illustrated by way of example only of use of an NLP system. As the NLP component 410 (including the machine learning component 438) learns different sets of data (e.g., images, maps, landscapes, historical information, etc.), the characteristics association component 412 (or "cognitive characteristics association component") may use the artificial intelligence to make cognitive associations or links between data sources 401-404 by determining images, landmarks, events, activities, historical data, structures, concepts, methods, similar characteristics, underlying common topics, and/or features.

Cognition is the mental process of knowing, including aspects such as awareness, perception, reasoning and judgment. An AI system uses artificial reasoning to interpret the data sources 401-404 and extract their topics, ideas, or concepts. The learned decisions, decision elements, alternatives to the decision, alternative options/choices, decision criteria, concepts, suggestions, topics and subtopics of a domain of interest, may not be specifically named or mentioned in the data sources 401-404 and is derived or inferred by the AI interpretation.

The learned content of the data sources consumed by the NLP system may be merged into a database 420 (and/or knowledge store) or other data storage method of the consumed content with learned images, landmarks, events, activities, historical data, structures, concepts, methods, similar characteristics, underlying common topics, and/or features of the data sources 401-404 providing association between the content referenced to the original data sources 401-404.

The database 420 may record and maintain the evolution of cognitive decisions, alternatives, criteria, subjects, topics, ideas, or content discussed in the data sources 401-404. The database 420 may track, identify, and associate all communication threads, messages, transcripts, images, mapping and geographical records and data, structural data (e.g., buildings, landmarks, etc.), musical archive data, books, scientific papers, online journals, journals, articles, drafts, materials related to emails, audio data, images or photographs, video data, and/or other various documents of all data generated during all stages of the development or "life cycle" of the decisions, decision elements, alternatives, choices, criteria, subjects, topics, or ideas. The merging of the data into one database 420 (which may include a domain knowledge) allows the time-dependent virtual reality environment system 430 to act like a search engine, but instead of keyword searches, it will use an AI method of making cognitive associations between the data sources using the deduced concepts so as to create a time-dependent 3D virtual reality environment according to time, space, and location.

The time-dependent virtual reality environment system 430 may include a user interface ("UI") component 434 (e.g., an interactive graphical user interface "GUI") for providing user interaction for sending or receiving one or more inputs/queries from a user. More specifically, the user interface component 434 may be in communication with a wireless communication device 455 (see also the PDA or cellular telephone 54A, the desktop computer 54B, the laptop computer 54C, and/or the video gaming system 54N of FIG. 2.) for also providing user input for inputting data such as, for example, data sources 401-404 and also providing user interaction for defining a selected time, selected location, one or more configurable boundaries and/or providing input for enhancing or adjusting the one or more configurable boundary parameters according to a selected time period, a selected location, one or more media images, the user input, an analysis operation, unstructured data from the data resources, or a combination thereof to create a 3D time-dependent virtual reality. The computing device 455 may use the UI component 434 (e.g., GUI) for providing input of data and/or providing a query functionality such as, for example, interactive GUI functionality for enabling a user to enter a query in the GUI 422 relating to the selected time, the selected location, one or more configurable boundaries, and/or other parameters, domain of interest, topic, decision, alternative criteria, or additional analysis. For example, GUI 422 may display 3D time-dependent virtual reality created according to the selected time, the selected location, and/or one or more configurable boundaries.

The time-dependent virtual reality environment system 430 may also include a 3D virtual reality component 432. The 3D virtual reality component 432 may use data retrieved directly from one or more data sources 401-404, data stored in the database 420 (or multiple immutable ledgers), data received from the user via the computing device 455, data from the time and location component 435 (e.g., a GPS device, mapping service, etc.), other components and/or a combination thereof to create a time-dependent three dimensional (3D) virtual environment having one or more configurable boundary parameters. That is, the 3D virtual reality component 432 may create and generate a 3D virtual reality based on user input, one or more cognitive computing systems (e.g., image/audio recognition component 437, machine learning component 438, analytics component 450, NLP component 410, etc.), data resources (e.g., data sources 401-404 received from data sources such as, for example, an HDFS or cloud computing system), or a combination thereof. The 3D virtual reality component 432 may also enhance, enrich and/or adjust the one or more configurable boundary parameters of the 3D virtual reality representation according to the selected time period, the selected location, one or more media images, the user input, an analysis operation, unstructured data from the data resources, or a combination thereof. In one aspect, for example, once the NLP component 410 has carried out the linking of the data, the 3D virtual reality component 432 may mine the maps, images, user input, time data, location data, concepts, topics, or similar characteristics, each of which may be stored in, and retrieved from, the database 420 of the consumed content to create the time-dependent 3D virtual reality presentation.

The time-dependent virtual reality environment system 430 may also include an image/audio recognition component 437 for identifying, updating, and/or enhancing media data (e.g., images, photographs, videos, audio data, live streaming data, etc.) and/or providing information relating to the plurality of images, photographs, videos, audio data, live streaming data according to a domain knowledge, which may be included in the database 420 and/or associated with the database 420. That is, the image/audio recognition component 437 may use one or more deep learning operations to analyze images for scenes, objects, faces, colors, food, text, explicit content and other subjects, and to understand the contents of images. The image/audio recognition component 437 may also enhance and classify the images, photographs, videos, audio data, and live streaming data.

The time-dependent virtual reality environment system 430 may include a mapping component 436. The mapping component 436 may provide mapping data relating to one or more time and space locations for various periods of time and locations. For example, the mapping component 436 may include topographical maps, aerial maps, electronic maps, video gaming landscapes, features, and design data, one or more GPS navigational tools/maps, user-selectable maps, historical maps, governmental maps, landmark data, survey data, construction maps/data, building blueprints data, roadmaps, or other geographical information or data relating to time or space.

The time-dependent virtual reality environment system 430 may include an analytics component 450 that may be used to analyze media data, user input, and unstructured data from the data sources 401-404 (e.g., received from various data resources) using the one or more cognitive computing applications.

A feedback component 439 may also be included in the time-dependent virtual reality environment system 430. For example, the feedback component 439 may collect feedback information from a user relating to the one or more configurable boundary parameters.

The time-dependent virtual reality environment system 430 may also include a machine learning component 438. The machine learning component 438 may learn, adjust, teach, or update the one or more configurable boundary parameters for creating, enhancing, and/or updating the time-dependent 3D virtual reality environment according to the feedback information. The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, the domain knowledge may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

In one aspect, the time-dependent virtual reality environment system 430 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.). It should be noted that each of the components of the time-dependent virtual reality environment system 430 may be individual components and/or separate components of the time-dependent virtual reality environment system 430.

Figure 5:
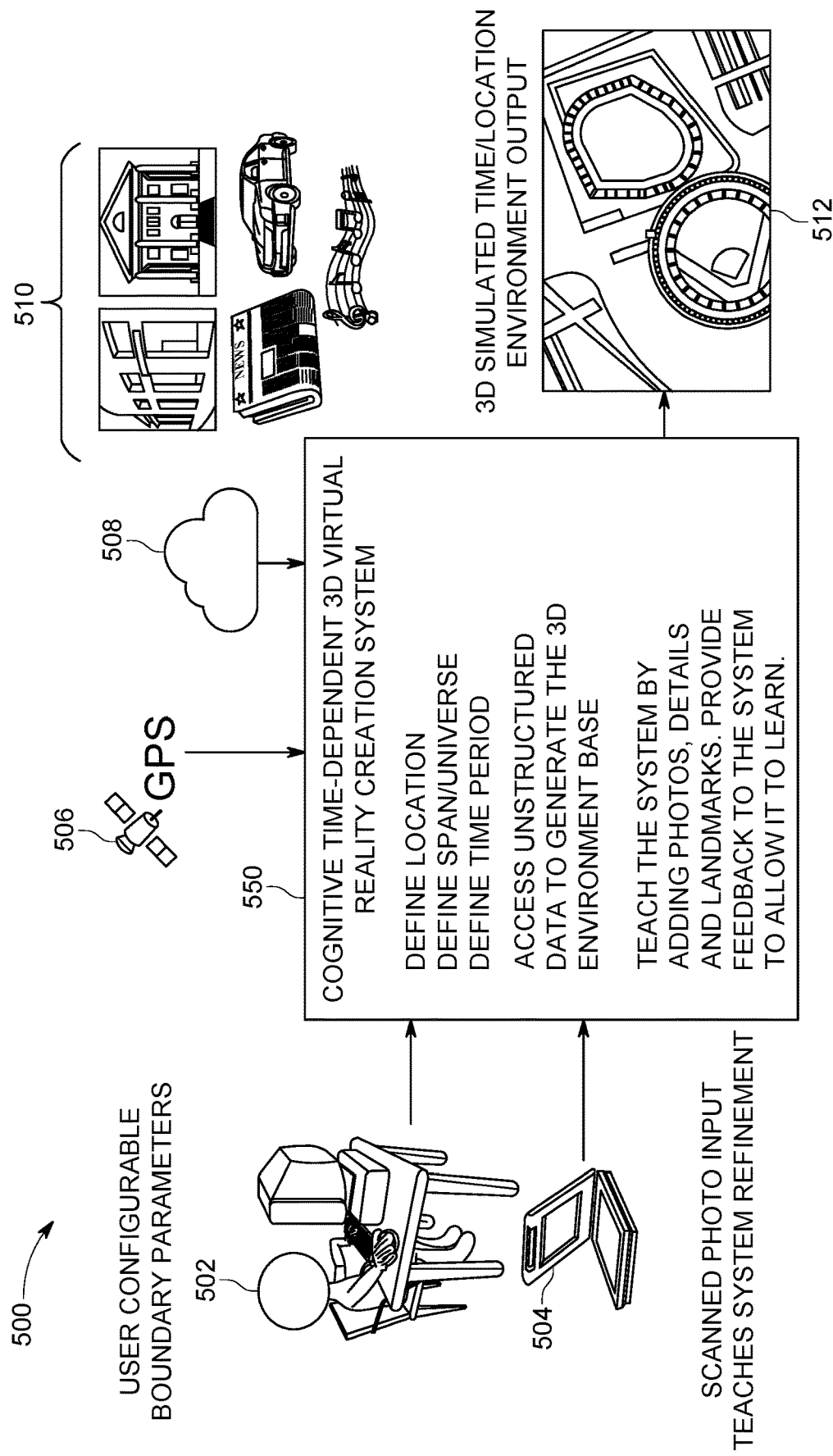
FIG. 5 is a block diagram depicting a system for delivery of a time-dependent virtual reality environment by a processor, again in which aspects of the present invention may be realized.

In view of the method 400 of FIG. 4, FIG. 5 depicts an additional system architecture of a cognitive time-dependent virtual reality environment system. In one aspect, one or more of the components, modules, services, applications, and/or functions described in FIGS. 1-4 may be used in FIG. 5.

The cognitive time-dependent virtual reality environment system 500 may include a user 502, a media device 504, a location system 506 (e.g., GPS system), one or more data resources 510, which may be associated with a cloud computing system 508 (or distributed file system), and a cognitive time-dependent 3D virtual reality creation system 550. In one aspect, the cognitive time-dependent virtual reality environment system may employ one or more cognitive applications (e.g., NLP, artificial intelligence (AI), machine learning, IBM® Watson® Alchemy Language (IBM Watson and Alchemy are trademarks of International Business Machines Corporation)) and one or more data resources 510 (e.g., Big Data resources such as data from a HDFS, GPS Satellite imaging data, cloud computing data, etc.), combined with user input to create a time-dependent 3D virtual reality environment 512 that are time period specific and location specific. The time-dependent 3D virtual reality environment 512 may be used in a variety of computing applications and systems such as, for example, using the time-dependent 3D virtual reality environment 512 in video entertainment products, forensic investigation recreation systems, and the like.

In one aspect, the cognitive time-dependent 3D virtual reality creation system 550 may receive one or more various inputs for creating the time-dependent 3D virtual reality environment. For example, a user 502 may provide one or more configurable boundary parameters to the cognitive time-dependent 3D virtual reality creation system 550. Media data (e.g., photographs, videos, etc.) may be input into the cognitive time-dependent 3D virtual reality creation system 550 such as, for example, scanned photographs to teach and refine the cognitive time-dependent 3D virtual reality creation system 550. Location data from location system 506 (e.g., GPS satellite data, or other type of mapping or location system) may provide input location data pertaining to a selected location (e.g., input an image of an aerial photograph captured over a selected area at a selected time period). Additionally, one or more data resources 510 may provide various types of data to the cognitive time-dependent 3D virtual reality creation system 550 such as, for example, unstructured data that may be in the form of government historical records, newspaper articles and images, weather information, musical archives and historical manufacturing archives (such as automotive and technological data), to supplement, enhance and refine the bounded simulation environment for both time period and location.

The cognitive time-dependent 3D virtual reality creation system 550, using the various input data (e.g., the configurable boundary parameters, image data, unstructured data, etc.), may be used to define a selected location, selected span/universe (e.g., size and scope of the virtual reality representation), and selected time period. The cognitive time-dependent 3D virtual reality creation system 550 may then use the unstructured data to generate and create a 3D virtual reality representation. One or more added images and details (and/or updated user input, unstructured data, or location data) may be used to teach the cognitive time-dependent 3D virtual reality creation system 550 to refine, adjust, and enhance the time-dependent 3D virtual reality environment 512.

In an additional aspect, the user 502 may define (e.g., the location, the size/scope, time period) and refine the time-dependent 3D virtual reality environment 512 by enabling the use of personal photographs and input of specific parameters for structures, such as buildings and landmarks. The time-dependent 3D virtual reality environment 512 (e.g., the output of the time-dependent 3D virtual reality creation system 550) may be a 3D virtual environment that is bounded, defined, refined and taught by the user of the time-dependent 3D virtual reality creation system 550, which can be integrated into various computing systems or applications such as, for example, 3D gaming systems for being time, era/period, and location specific or forensic investigations of cold cases from specific time periods.

Figure 6A:
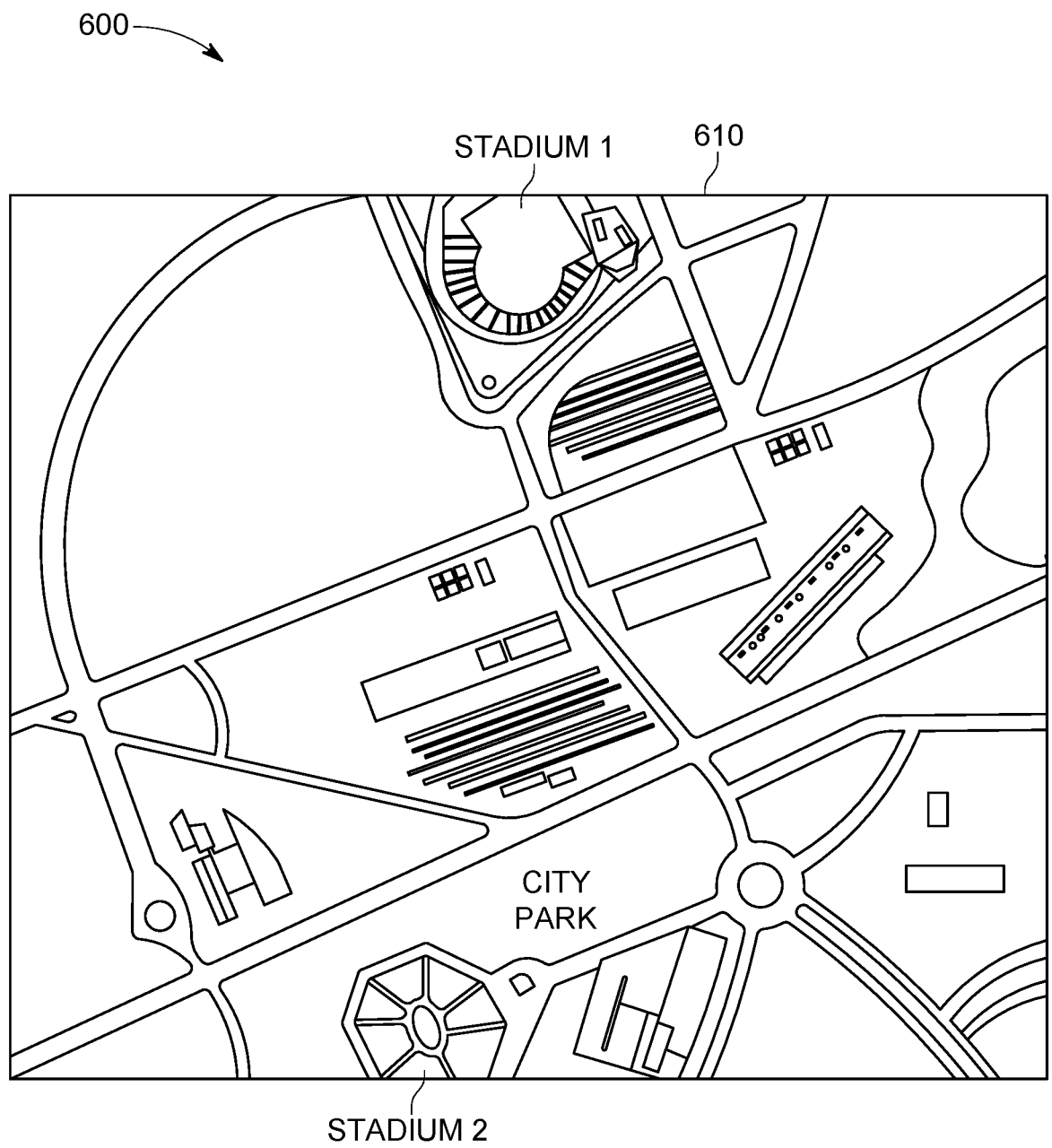
FIGS. 6A-6B are diagrams depicting a time-dependent 3D virtual reality environment in a computing system in accordance with aspects of the present invention.
Figure 6B:
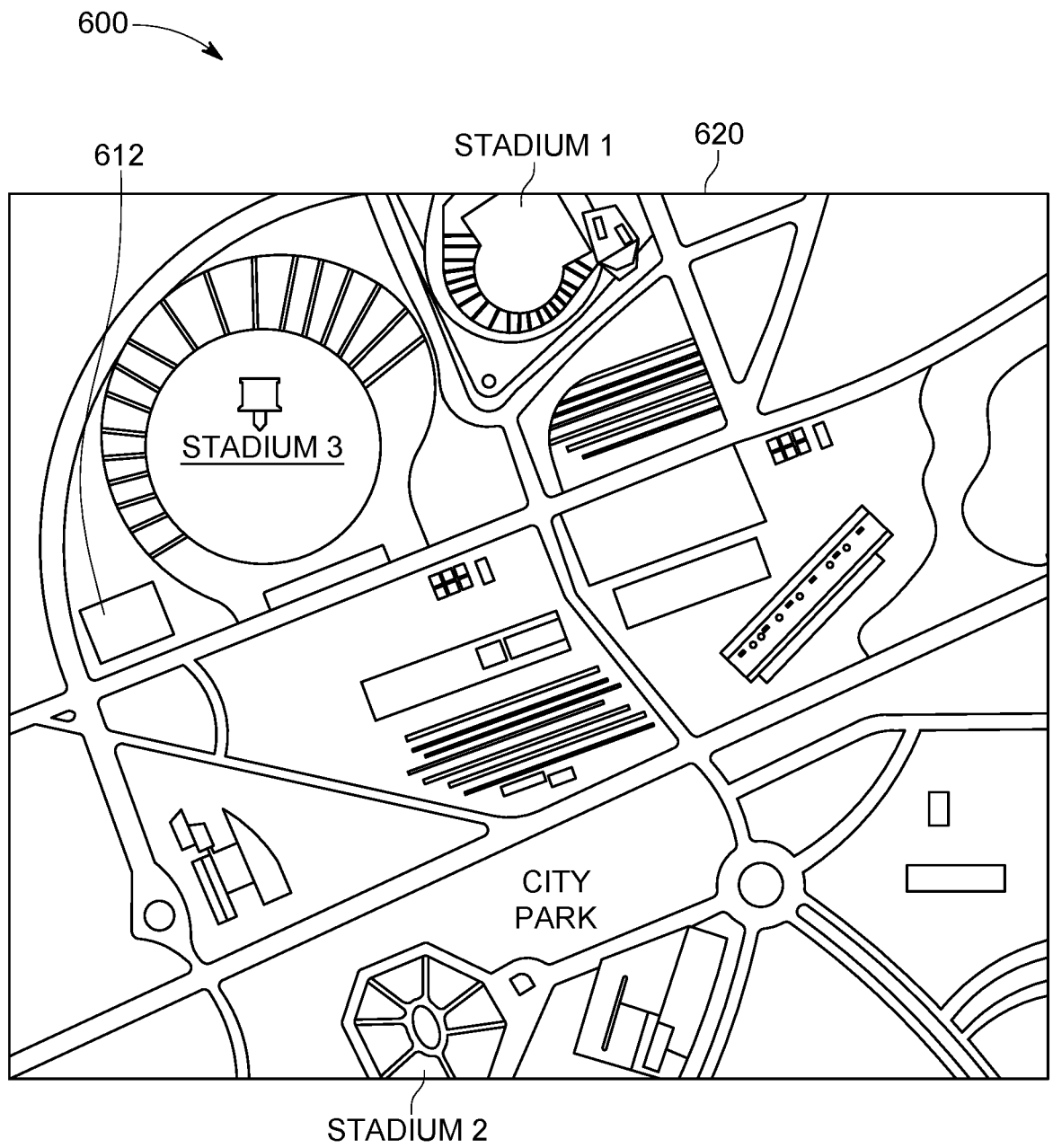

Turning now to FIGS. 6A-6B, diagrams depict a time-dependent 3D virtual reality environment 600 in accordance with aspects of the present invention. In one aspect, one or more of the components, modules, services, applications, and/or functions described in FIGS. 1-5 may be used in FIGS. 6A-6B. Diagram 600 illustrates a present day map 610 (e.g., an aerial photograph of the present day of a selected location and a time-dependent 3D virtual reality environment 620 having one or more configurable boundary parameters according to user input, one or more cognitive computing systems, data resources, or a combination thereof. To further illustrate, assume a user desires to see a photographic rendering of the time period 1965 that includes a stadium (e.g., stadium 3) where a music concert was held. Assume, also that stadium 3 was subsequently demolished and is now a parking lot. However, the current image 610 displays a photographic rendering of the present day only showing stadium 1 and a parking lot (which was were stadium 3 was previously located) and stadium 2.

Thus, using the various embodiments described herein, the mechanisms of the present invention provide a solution for delivery of a time-dependent virtual reality environment. That is, using the configurable boundary parameters defining a selected time, space, and location (e.g., a photographic rendering of the time period 1965 that includes a stadium 3 where a music concert was held), a time-dependent 3D virtual environment is created of 1965 having one or more configurable boundary parameters illustrating stadium 3 according to the user input, one or more cognitive computing systems, data resources, or a combination thereof. As depicted, stadium 3 is now depicted in the time-dependent 3D virtual reality environment 620 in the original position of the selected location and the selected time period of 1965.

Figure 7:
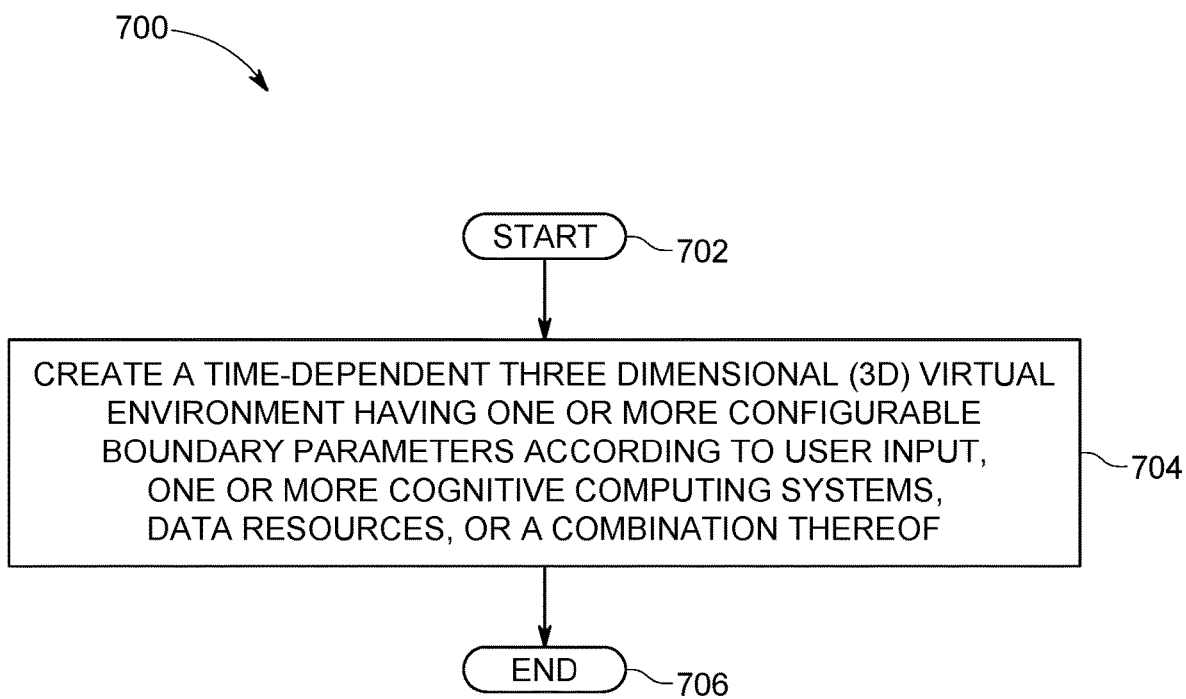
FIG. 7 is a flowchart diagram depicting an exemplary method for delivery of a time-dependent 3D virtual reality environment in a computing system by a processor in accordance with aspects of the present invention.

FIG. 7 is a flowchart diagram depicting an exemplary method for delivery of a time-dependent virtual reality environment in a computing environment. The functionality 700 may be implemented as a method executed as instructions on a machine, where the instructions are included on at least one computer readable medium or one non-transitory machine-readable storage medium. The functionality 700 may start in block 702. A time-dependent three dimensional (3D) virtual environment, having one or more configurable boundary parameters, may be created according to user input, one or more cognitive computing systems, data resources, or a combination thereof, as in block 704. The functionality 700 may end, as in block 706.

Figure 8:
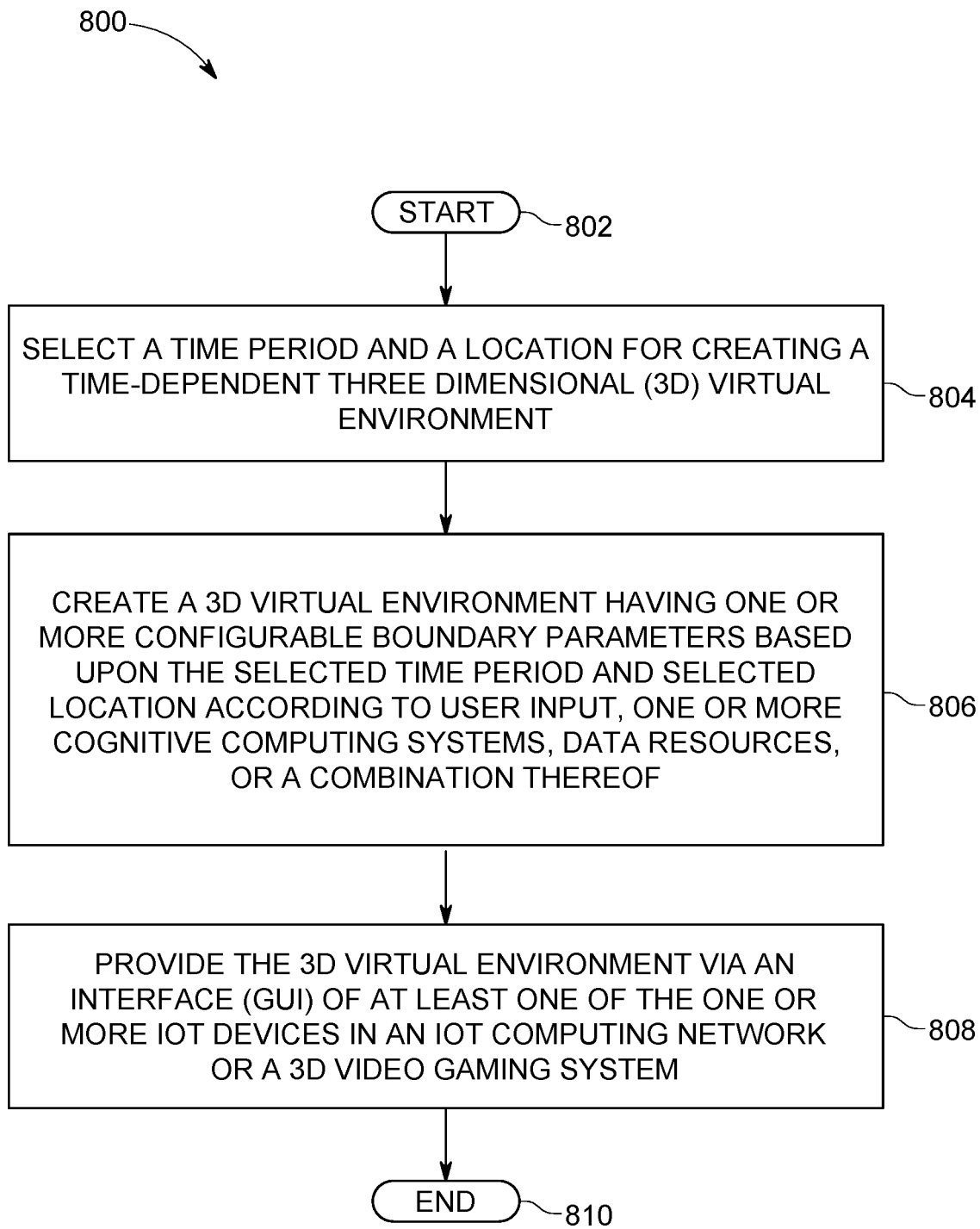
FIG. 8 is a flowchart diagram depicting an exemplary method for delivery of a time-dependent 3D virtual reality environment in a computing system by a processor, again in which aspects of the present invention may be realized.

FIG. 8 is a flowchart diagram depicting an exemplary method for data replication in a distributed file system environment. The functionality 800 may be implemented as a method executed as instructions on a machine, where the instructions are included on at least one computer readable medium or one non-transitory machine-readable storage medium. The functionality 800 may start in block 802. A time period and a location may be selected for creating a time-dependent three dimensional (3D) virtual environment, as in block 804. A 3D virtual environment, having one or more configurable boundary parameters based upon the selected time period and selected location, may be created according to user input data, one or more cognitive computing systems, one or more data resources, or a combination thereof, as in block 806. The 3D virtual environment may be provided via an interface (GUI) of at least one of the one or more IoT devices in an IoT computing network or a 3D video gaming system, as in block 808. The functionality 800 may end, as in block 810.

In one aspect, in conjunction with and/or as part of at least one block of FIGS. 7-8, the operations of methods 700 and/or 800 may include each of the following. The operations of methods 700 and/or 800 may select a time period and a location for creating the time-dependent 3D virtual environment. The one or more configurable boundary parameters may be defined. The one or more configurable boundary parameters may be enhanced, enriched, and/or adjusted according to a selected time period, a selected location, one or more media images, the user input, an analysis operation, unstructured data from the data resources, or a combination thereof.

The operations of methods 700 and/or 800 may analyze media data, the user input, unstructured data from the data resources using the one or more cognitive computing systems, wherein the one or more cognitive computing systems include a machine learning system, a natural langue processing (NLP) system, an image and audio recognition system, an intelligent search system, a cognitive memory system, or combination thereof. Media data, additional user input data, global positioning satellite (GPS) data, a plurality of physical structure and landmark data may be added to enhance, enrich, and/or adjust the time-dependent 3D virtual environment.

The operations of methods 700 and/or 800 may collect feedback information from a user relating to the one or more configurable boundary parameters and initialize a machine learning component to learn, adjust, or update the one or more configurable boundary parameters according to the feedback information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for delivery of a time-dependent virtual reality environment in a computing system, comprising:
    receiving user input on a user interface of a query, wherein the query includes one or more configurable boundary parameters, the one or more boundary parameters including at least a selected time period and a selected location geographically;
    responsive to receiving the query, parsing and analyzing unstructured data in data resources by one or more cognitive computing systems to identify content within the historical documents, historical media images, and other historical information associated with the selected time period at the selected location, wherein the data sources include governmental archives, historical news articles, and other public archives, and wherein the content data sources is cognitively deduced as relevant to the selected time period and the selected location according to the analyzation by the cognitive computing systems notwithstanding whether the content explicitly references and includes data from the selected location at the selected time period;
    amalgamating selected portions of the content in the data sources deduced as relevant to the selected time period and the selected location, wherein a natural language processing (NLP) operation is used by the one or more cognitive computing systems to transcribe text within the content in determining those portions of the content are relevant to the selected location and the selected time period; and
    creating a time-dependent three dimensional (3D) virtual environment having the one or more configurable boundary parameters using the selected portions of the content.

2. The method of claim 1, further including:
    defining the one or more configurable boundary parameters; or
    enhancing or adjusting the one or more configurable boundary parameters according to the selected time period, the selected location, the historical media images, the user input, an analysis operation, the unstructured data from the data resources, or a combination thereof.

3. The method of claim 1, wherein the one or more cognitive computing systems include a machine learning system, an image and audio recognition system, an intelligent search system, a cognitive memory system, or combination thereof.

4. The method of claim 1, further including adding media data, the user input, global positioning satellite (GPS) data, a plurality of physical structure and landmark data, or a combination thereof to enhance the time-dependent 3D virtual environment.

5. The method of claim 1, further including:
    collecting feedback information from a user relating to the one or more configurable boundary parameters; and
    initializing a machine learning component to learn, adjust, or update the one or more configurable boundary parameters according to the feedback information.

6. The method of claim 1, further including providing the time-dependent 3D virtual environment via the user interface of at least one of one or more Internet of Things (IoT) devices in an IoT computing network or a 3D video gaming system.

7. A system for delivery of a time-dependent virtual reality environment in a computing system, comprising:
one or more computers with executable instructions that when executed cause the system to:
receive user input on a user interface of a query, wherein the query includes one or more configurable boundary parameters, the one or more boundary parameters including at least a selected time period and a selected location geographically;
responsive to receiving the query, parse and analyze unstructured data in data resources by one or more cognitive computing systems to identify content within the historical documents, historical media images, and other historical information associated with the selected time period at the selected location, wherein the data sources include governmental archives, historical news articles, and other public archives, and wherein the content data sources is cognitively deduced as relevant to the selected time period and the selected location according to the analyzation by the cognitive computing systems notwithstanding whether the content explicitly references and includes data from the selected location at the selected time period;
amalgamate selected portions of the content in the data sources deduced as relevant to the selected time period and the selected location, wherein a natural language processing (NLP) operation is used by the one or more cognitive computing systems to transcribe text within the content in determining those portions of the content are relevant to the selected location and the selected time period; and
create a time-dependent three dimensional (3D) virtual environment having the one or more configurable boundary parameters using the selected portions of the content.

8. The system of claim 7, wherein the executable instructions that when executed cause the system to:
define the one or more configurable boundary parameters; or
enhance or adjust the one or more configurable boundary parameters according to the selected time period, the selected location, the historical media images, the user input, an analysis operation, the unstructured data from the data resources, or a combination thereof.

9. The system of claim 7, wherein the one or more cognitive computing systems include a machine learning system, an image and audio recognition system, an intelligent search system, a cognitive memory system, or combination thereof.

10. The system of claim 7, wherein the executable instructions that when executed cause the system to add media data, the user input, global positioning satellite (GPS) data, a plurality of physical structure and landmark data, or a combination thereof to enhance the time-dependent 3D virtual environment.

11. The system of claim 7, wherein the executable instructions that when executed cause the system to:
collect feedback information from a user relating to the one or more configurable boundary parameters; and
initialize a machine learning component to learn, adjust, or update the one or more configurable boundary parameters according to the feedback information.

12. The system of claim 7, wherein the executable instructions that when executed cause the system to provide the time-dependent 3D virtual environment via the user interface of at least one of one or more Internet of Things (IoT) devices in an IoT computing network or a 3D video gaming system.

13. A computer program product for, by a processor, delivery of a time-dependent virtual reality environment in a computing system, the computer program product comprising a non-transitory computer-readable storage medium having computer-readable program code portions stored therein, the computer-readable program code portions comprising:
an executable portion that receives user input on a user interface of a query, wherein the query includes one or more configurable boundary parameters, the one or more boundary parameters including at least a selected time period and a selected location geographically;
an executable portion that, responsive to receiving the query, parses and analyzes unstructured data in data resources by one or more cognitive computing systems to identify content within the historical documents, historical media images, and other historical information associated with the selected time period at the selected location, wherein the data sources include governmental archives, historical news articles, and other public archives, and wherein the content data sources is cognitively deduced as relevant to the selected time period and the selected location according to the analyzation by the cognitive computing systems notwithstanding whether the content explicitly references and includes data from the selected location at the selected time period;
an executable portion that amalgamates selected portions of the content in the data sources deduced as relevant to the selected time period and the selected location, wherein a natural language processing (NLP) operation is used by the one or more cognitive computing systems to transcribe text within the content in determining those portions of the content are relevant to the selected location and the selected time period; and
an executable portion that creates a time-dependent three dimensional (3D) virtual environment having the one or more configurable boundary parameters using the selected portions of the content.

14. The computer program product of claim 13, further including an executable portion that:
defines the one or more configurable boundary parameters;
adjusts the one or more configurable boundary parameters according to the selected time period, the selected location, the historical media images, the user input, an analysis operation, the unstructured data from the data resources, or a combination thereof; or
enhances the time-dependent 3D virtual environment by adding the one or more media images, updated user input, global positioning satellite (GPS) data, a plurality of physical structure and landmark data, or a combination thereof.

15. The computer program product of claim 13, wherein the one or more cognitive computing systems include a machine learning system, an image and audio recognition system, an intelligent search system, a cognitive memory system, or combination thereof.

16. The computer program product of claim 13, further including an executable portion that:

collects feedback information from a user relating to the one or more configurable boundary parameters; and initializes a machine learning component to learn, adjust, or update the one or more configurable boundary parameters according to the feedback information.

17. The computer program product of claim 13, further including an executable portion that provides the time-dependent 3D virtual environment via the user interface of at least one of one or more Internet of Things (IoT) devices in an IoT computing network or a 3D video gaming system.

* * * * *